United States Patent
Gupta (10) Patent No.: US 9,549,312 B2
(45) Date of Patent: Jan. 17, 2017

(54) DYNAMICALLY SWITCHING NETWORK SERVICE PROVIDERS

(71) Applicant: Alcatel Lucent, Paris (FR)

(72) Inventor: Varun Gupta, Gurgaon (IN)

(73) Assignee: Alcatel Lucent, Boulogne-Billancourt (FR)

( * ) Notice: Subject to any disclaimer, the term of this patent is extended or adjusted under 35 U.S.C. 154(b) by 45 days.

(21) Appl. No.: 14/359,513

(22) PCT Filed: Sep. 28, 2012

(86) PCT No.: PCT/EP2012/069221
§ 371 (c)(1),
(2) Date: May 20, 2014

(87) PCT Pub. No.: WO2013/075873
PCT Pub. Date: May 30, 2013

(65) Prior Publication Data
US 2014/0329504 A1    Nov. 6, 2014

(30) Foreign Application Priority Data

Nov. 21, 2011 (IN) .......................... 3309/DEL/2011

(51) Int. Cl.
*H04W 8/06* (2009.01)
*H04W 48/18* (2009.01)
(Continued)

(52) U.S. Cl.
CPC ............. *H04W 8/06* (2013.01); *H04Q 3/0045* (2013.01); *H04W 4/001* (2013.01); *H04W 4/003* (2013.01); *H04W 12/06* (2013.01); *H04W 48/18* (2013.01)

(58) Field of Classification Search
CPC ........ H04W 8/06; H04W 4/001; H04Q 3/0045
See application file for complete search history.

(56) References Cited

U.S. PATENT DOCUMENTS

2002/0197991 A1* 12/2002 Anvekar ............... H04W 8/183
  455/432.1
2007/0011225 A1   1/2007 Hsu et al.
(Continued)

FOREIGN PATENT DOCUMENTS

EP    1 173 037 A2    1/2002
EP    2237545          10/2010
(Continued)

OTHER PUBLICATIONS

International Search Report for PCT/EP2012/069221 dated Mar. 11, 2013.

*Primary Examiner* — Kashif Siddiqui
*Assistant Examiner* — Minjung Kim
(74) *Attorney, Agent, or Firm* — Fay Sharpe, LLP (57) ABSTRACT

Methods and systems for dynamic switching between service providers are described. The method includes receiving a service provider switch (SPS) request from a User Equipment (UE) having a subscriber identity module (SIM) associated with a primary service provider where the request is indicative of switching the SIM from the primary service provider to a secondary service provider. The method further includes authenticating the SPS request based at least on the user subscription and triggering an update of a service control point (SCP) address in a home location register (HLR) of the primary service provider based on response to the authentication. The method may further include receiving another SPS request from the UE to switch the SIM from the secondary service provider to one of a former service provider and triggering an update of SCP details in the HLR of the primary service provider.

16 Claims, 4 Drawing Sheets (51) Int. Cl.
*H04W 12/06* (2009.01)
*H04Q 3/00* (2006.01)
*H04W 4/00* (2009.01)

(56) References Cited

U.S. PATENT DOCUMENTS

| | | | |
|---|---|---|---|
| 2007/0249338 A1* | 10/2007 | Schwalb | H04W 8/04 |
| | | | 455/433 |
| 2008/0104615 A1* | 5/2008 | Nolan | G06F 19/322 |
| | | | 719/328 |
| 2008/0200155 A1* | 8/2008 | Hasemann | H04W 4/12 |
| | | | 455/414.3 |
| 2010/0056139 A1* | 3/2010 | Strittmatter | H04W 12/12 |
| | | | 455/433 |
| 2010/0311391 A1 | 12/2010 | Siu et al. | |
| 2010/0311468 A1 | 12/2010 | Shi et al. | |
| 2011/0130117 A1 | 6/2011 | Fan et al. | |

FOREIGN PATENT DOCUMENTS

| | | |
|---|---|---|
| EP | 2290907 | 3/2011 |
| JP | 2002-095038 | 3/2002 |

* cited by examiner

DYNAMICALLY SWITCHING NETWORK SERVICE PROVIDERS

The present subject matter relates to communication networks and, particularly, but not exclusively, to dynamically switching network service providers in the communication network.

BACKGROUND

Communication devices, such as cellular phones, smart phones, personal digital assistants (PDAs), provide users with a variety of mobile communications services and networking capabilities. These communication services allow data to be exchanged between the service providers and the users. Mobile radio network operators currently operate not only on the prevalent mobile radio systems using the GSM standard for mobile communications, but also on networks using the new and evolved Universal Mobile Telecommunications Service (UMTS) standard. Based on such standards and the infrastructure to support data exchange, the service providers provide connectivity to the users. Further, the users are charged for the communication services provided by the service provider or an operator, based on various parameters. Examples of such parameters can be location of a user who initiates a call, i.e., a caller party, location of a user to whom the call is directed, i.e., a called party, type of connection associated with the caller party, i.e., a pre-paid connection or a post paid connection, and the type of service requested by the user.

Typically, a user subscribes to the communication services provided by the service provider in a pre-defined geographic coverage area or circle, which is also referred to as a home network of the user. The subscription of the user for the communication services are with a fixed service provider to which the user is registered, and is the default service provider of the user. Generally, the user connects to the default service provider for the communication services, however, in certain situations, such as when the user is outside the home network, i.e., when the user is on "roaming", the user may connect to a service provider other than the default service provider. Generally, if a communication service is requested through the default service provider, the user is charged according to the normal tariffs. But, when the user is connected to service providers other than the default service provider, incremented rates of providing services may be charged in addition to the normal tariffs.

SUMMARY

This summary is provided to introduce concepts related to dynamically switching network service providers in a communication network. This summary is not intended to identify essential features of the claimed subject matter nor is it intended for use in determining or limiting the scope of the claimed subject matter.

In an embodiment, a method includes receiving a service provider switch (SPS) request from a User Equipment (UE) having a subscriber identity module (SIM) associated with a primary service provider where the request is indicative of switching the SIM from the primary service provider to a secondary service provider. The method further includes authenticating the SPS request based at least on the user subscription and triggering an update of a service control point (SCP) address in a home location register (HLR) of the primary service provider based on response to the authentication. In another embodiment, the SIM may be a subscription associated with the user that may be provided by the primary service provider.

In yet another embodiment of the present subject matter, the method may further include receiving another SPS request from the UE where the another SPS request is indicative of switching the SIM from the secondary service provider to one of a former service provider and triggering an update of SCP details in the HLR of the primary service provider. In said implementation, the SCP details in the HLR are updated with the SCP details of the former service provider.

In another embodiment of the present subject matter, a Service Control Point (SCP) for dynamically switching between different network service providers is described. The SCP may include a request receiving module configured to receive a service provider switch (SPS) request from a User Equipment (UE) having a subscriber identity module (SIM) associated with a primary service provider where the request is indicative of switching the SIM from the primary service provider to a secondary service provider. The SCP further includes an authentication module configured to authenticate the user to switch from the primary service provider to the secondary service provider based at least on the user subscription; and trigger an update of a service control point (SCP) address in a home location register (HLR) of the primary service provider based on response to the authentication.

In yet another implementation, a Service Provider Selector Node (SPSN) is described. The SPSN may include a request processing module configured to receive a service provider switch (SPS) request, wherein the SPS request is indicative of a request to switch a subscriber identity module (SIM) associated with a user from a primary service provider to a secondary service provider. The SPSN may further include an authorizing module (226) configured to authorize the SPS request based at least on an agreement between the primary service provider and a secondary service provider. In said implementation, the SPSN may also include an updating module configured to update the home location register (HLR) belonging to the primary service provider with details of a secondary service provider's service control point (SCP) address.

In yet another implementation, a Home Location Register (HLR) is described. The HLR may include a profile module configured to obtain a service control point (SCP) address update request, for a subscriber identity module (SIM), wherein the request is indicative of address reference and other details associated with a SCP of a secondary service provider for updation with the SIM. The profile module may further be configured to communicate the details associated with the SCP of the secondary service provider to a mobile service switching centre (MSC).

In one implementation, a computer-readable medium is described. The computer readable medium may have embodied thereon a computer readable program code for executing a method comprising receiving, from a user equipment (UE) having a subscriber identity module (SIM) associated with a primary service provider, a service provider switch (SPS) request, where the request is indicative of switching the SIM from a primary service provider to a secondary service provider. The method may further comprise authenticating the SPS request based at least on a user subscription, and triggering an update of a service control point (SCP) in a home location register (HLR) of the primary service provider based on a response received to the authentication.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

Systems and methods for dynamically switching communication network service provider from a service provider to another service provider are described. In one implementation, the systems and methods for dynamically switching network service provider involve sharing of a Subscriber Identity Module (SIM) in a Global System for Mobile Communication (GSM) network among multiple service providers.

The systems and methods can be implemented in systems capable of exchanging data in accordance with the GSM techniques utilizing the different GSM communication standards, such as 2G and 3G. Further, the methods may also be implemented in systems capable of exchanging data in accordance with the Code Division Multiple Access (CDMA) technique utilizing the different CDMA communication standards, such as IS 95 or cdmaOne, and CDMA 2000; and Internet Protocol (IP) Multimedia Subsystem (IMS).

The techniques described herein may be used for various wireless communication systems, such as Code Division Multiple Access (CDMA), Time Division Multiple Access (TDMA), Frequency Division Multiple Access (FDMA), Orthogonal Frequency-Division Multiple Access (OFDMA), Single Carrier Frequency Division Multiple Access (SC-FDMA) and other systems. A CDMA system may implement a radio technology, such as Universal Terrestrial Radio Access (UTRA), cdma2000, etc. UTRA includes variants of CDMA. Cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.20, IEEE 802.16 (WiMAX), 802.11 (WiFi™), Flash-OFDM®, etc. UTRA and E-UTRA are part of Universal Mobile Telecommunication System (UMTS). 3GPP Long Term Evolution (LTE) is an upcoming release of UMTS that uses E-UTRA. UTRA, E-UTRA, UMTS, LTE and GSM are described in documents from an organization "3rd Generation Partnership Project" (3GPP). Cdma2000 and UMB are described in documents from an organization named "3rd Generation Partnership Project 2" (3GPP2). For clarity, certain aspects of the techniques are described below for WCDMA, and 3GPP terminology is used in much of the description below.

The systems and methods can be implemented in a variety of entities, such as communication devices. The entities that can implement the described method(s) include, but are not limited to, hand-held devices, mobile phones, PDAs, smartphones, and the like. Further, the method may also be implemented by devices capable of exchanging data to provide connectivity to different communication devices and computing systems. Such devices may include, but are not limited to, data cards, mobile adapters, wireless (WiFi) adapters, routers, and the like.

The increasing use of telecommunication devices, such as cell phones, Personal Digital Assistants (PDAs), and smart phones has increased the requirements of workforce mobility. In order to compete with each other and attract more and more customers, network service providers are investing in infrastructure to provide better, competent and state of the art communication services. In such a competitive environment, advancements in the telecommunication technology are constantly made to meet demands of the ever demanding and increasing users.

The network service providers provide the users with different call tariffs, data plans, and charges for other communication services. Although the users have a plethora of options to choose from and avail such services, the use of such services is limited to the ones provided by the default service provider of the user. Default service provider may be understood as the service provider to which the user has been registered with.

To provide wireless connectivity, a service provider with which the user is registered, also referred to as the default service provider hereinafter, issues a Subscriber Identity Module (SIM) to a user. The user utilizes the SIM along with a communication device, such as a User Equipment (UE) to connect to the communication network through the default service provider. The SIM authorizes the user to connect with the service provider based on a unique International Mobile Subscriber Identity (IMSI) number and a unique Mobile Station International Subscriber Directory Number (MSISDN) which are allocated to the user by the default service provider. Therefore, based on the MSISDN, and the IMSI number, a service provider identifies a user registered with it to be a native user and a user registered with other service providers to be a non-native user. Further, when a native user is utilizing the communication services provided by the default service provider within pre-defined geographic boundaries, the user is defined to be in a home network, and when the native user is utilizing the communication services provided by the default service provider outside the pre-defined geographic boundaries, for example, when the user is roaming, the user is defined to be in a non-home network.

To utilize the services provided by the service providers other than the default service provider, a user has to choose one of the other service providers and subscribe to the same. The process of changing a service provider and switching the subscription involves formalities, paperwork etc. Further the process may involve change of SIM along with the MSISDN. Although due to advancements in technology, users can change their default service provider from one to the other without changing the MSISDN, however, still to change the default service provider, a change of SIM is generally required. This is because the IMSI number associated with a SIM is specific to a service provider and the information related to each SIM is available with only with the default service provider of the user. Thus, a user is limited by the communication services provided by the default service provider availed based on the use of the SIM provided by the default service provider.

Even in scenarios where the SIM change is not required, the subscriber, at one point of time, is able to avail the features/subscriptions of one Service Provider only. There may be some cases where a user may utilize the services of a service provider other than the default service provider without having to change the SIM. For example, in some situations, a user may also choose communication services provided by another service provider by manual selection, such as when the network of the default service provider is not available. In another situation, the user may utilize communication services provided by another service provider when in a non-home network. However, in these situations the user may be levied with increased communication service charges.

According to an implementation of the present subject matter, systems and methods for switching a SIM from its default service provider, hereinafter referred to as a primary service provider; to another service provider, hereinafter referred to as a secondary service provider, on a dynamic basis are described. In one implementation, the SIM allocated to a user is switched dynamically based on user request, from the primary service provider to one or more of the available secondary service providers. The SIM may either be a physical entity provided by the primary service provider, or may be a subscription associated with the user provided by the primary service provider. In said implementation, the user would be charged based on tariff of the secondary service provider whilst maintaining the same SIM and the MSISDN provided by the default service provider. In another implementation, the user may dynamically switch the SIM from the secondary service provider to a former service provider, where the former service provider may be any service provider other than the secondary service provider and may include the primary service provider as well. In said implementation, the switching of the SIM from the primary service provider to the secondary service provider does not require any physical change in the SIM or the communication device utilized by the user and the user may utilize the SIM provided by the default service provider to avail the services provided by the secondary service provider.

As described before, the systems and methods can be implemented in a variety of processing and communication devices capable of communicating with a network according to the different standards defined for the communication. Although the description herein is explained with reference to a communication device, such as a mobile phone, the described method(s) may also be implemented in any other devices, as will be understood by those skilled in the art.

The systems and methods described herein may be implemented in a variety of communication networks employing various communication devices and/or computing system or devices. The communication network may include Global System for Mobile Communication (GSM) network, Universal Mobile Telecommunications System (UMTS) network, Long Term Evolution (LTE) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Although the description herein is with reference to certain communication networks, the systems and methods may be implemented in other networks and devices, albeit with a few variations, as will be understood by a person skilled in the art.

The systems and methods as described herein, on one hand, enable dynamically switching the SIM from one service provider to the other, on the other, allows a user to have connections of multiple service providers at the same time based one SIM and MSISDN number.

In general, the MSISDN and the IMSI number associated with a SIM are specific to a service provider. The information related to each SIM, along with other details related to the user, are stored in the Home Location Register (HLR) of the default service provider with which the user is registered, i.e., the primary service provider. Each service provider manages a HLR implemented in the home network of the user which includes information of all the native users of the service provider in the home network. The HLR of the home network of the user is hereinafter referred to as home HLR. The MSISDN and the IMSI number of each newly registered user are updated to the respective home HLR by the primary service providers from time to time. Further, the current location of each user is available with the home HLR of the primary service provider based on which the calls are connected and routed to any user communicating within the communication network.

The subscription details of each user, such as credit available with the user, user's block list, subscription to services, and other subscriber data required for charging the user are maintained by the primary service provider of the user at a Service Control Point (SCP). The SCP of the primary service provider, also referred to as the home SCP, maintains the data of the users who have subscribed to the various services of that service provider. It would be understood by those skilled in the art that each service provider may include multiple SCPs where data of the native users is stored. Further, each native user of the service provider may be associated with a single SCP of the primary service provider and each such SCP may cater to multiple subscribers of the primary service provider.

In general, a user is charged for the communication services at the home SCP associated with the user. The details of the home SCP, associated with each user, are available with the home HLR implemented by the primary service provider. HLR includes the user related details in the form of CAMEL subscription information, hereinafter referred to as subscription details, containing the home SCP Address and other user service subscription details. During communications, such as calls originating or terminating at the user, the home SCP authorizes the communication based on the user's subscription comprising various parameters, such as available balance, users block list, and so on. The home SCP also charges the user for the communication services based on the user's subscription and the adopted tariff plan. Hence, each user is allowed to utilize the communication services provided by the service provider upon authentication from the home SCP associated with the user. Home SCP thus provides a controlling logic for all calls originating from/terminating at the users associated with the home SCP. This also includes CAMEL based in-call consultation, event notifications and call control messages, such as Initial Detection Point (IDP), application of charging report, and event report BCSM, exchange between the Network Switches/entities such as Gateway (G) Mobile Switching Centers (MSC)/MSC and home SCP.

In one example, if a user is in a non-home network and is utilizing the communication services through some other service provider, the communication services of the user are still authenticated by the home SCP associated with the user, and managed by the primary service provider of the user. In such a scenario, the network entities belonging to other service provider would still communicate with the home HLR of the user to obtain the details of the home SCP associated with the user. Upon receiving the details, the other service provider may in-turn communicate with the home SCP to obtain the authentication to provide the communication services to the user in the non-home network. Further, the other service provider may provide the details of the communication services utilized by the user to the home SCP, such that the home SCP may charge the user for the communication services provided by the other service provider.

Thus, as explained, all subscription details of a user are available with the home SCP of the primary service provider. In case the user is to avail the services of any other service provider apart from the primary service provider, i.e., if a user wishes to switch the service provider from the primary service provider to the secondary service provider, as a prerequisite, the secondary service provider needs the subscription details, available to the primary service provider.

In accordance with one embodiment of the present subject matter, described herein is a method of providing the subscription details of a user, available to the primary service provider to the secondary service provider, based on which the secondary service provider may be enabled to allow the user to avail the communication services of the secondary service providers.

Typically, to communicate over the communication network, a user, through his UE connects to a network entity, such as a Mobile service Switching Centre (MSC). While providing any communication service to a user, the MSC to which the subscriber is currently connected may communicate with the home SCP of the user. The home SCP in turn may authorize the communication service based on a user subscription.

It would be understood by those skilled in the art that the MSC to which a user is connected to may be implemented by a certain service provider, which may or may not be the primary service provider of the user, i.e., the user may either be a native or a non-native user to the service provider hosting the MSC. If a non-native user is connected to the MSC, the MSC may retrieve the address of the home SCP associated with the non-native user from the home HLR of the user's primary service provider. In other words, to obtain the data related to non-native users, a MSC would have to query the home HLR of the non-native user, controlled by some other service provider which is the user's primary service provider.

The exchange of information regarding the address of home SCP between the MSC and the home HLR of the primary service provider of a user may take place during the location update procedure of any UE of the user. During the location update procedure the MSC to which the user is connected to, updates the home HLR of the user with the user's current location. The MSC may in turn, along with other information, receive the address of the home SCP associated with the user.

Once, this address is available with the MSC, the MSC may use the address of the primary service provider's SCP, i.e., the home SCP of the user for authentication and billing purposes in case the user avails the services of the secondary service providers. Such situations may arise, for example, when the user manually selects the network of the secondary service providers or when is not in the home network and is roaming. Thus, the billing of the communication services utilized by a user is performed by the home SCP whose address is made available to the MSC by the home HLR. As apparent from the aforegoing description, the address of the SCP made available to the MSC is conventionally the address of the home SCP.

In accordance with one embodiment of the present subject matter, the home HLR may be updated with the SCP details of a secondary service provider to which a user wishes to switch for the billing of the communication services to take place through the secondary service provider's SCP, hereinafter referred to as the secondary SCP. Accordingly, in one embodiment of the present subject matter, based on an indication to switch service provider received for a user, the home HLR may be updated with the address of the secondary SCP for the user to avail communication services of the secondary service provider.

For this purpose, in one implementation, the user may send an Unstructured Supplementary Service Data (USSD) request from his UE to switch from his primary service provider to a secondary service provider. As would be apparent to a person skilled in the art, a USSD request is serviced by the home SCP associated with the user. Accordingly, the USSD request sent by the user is sent to the home SCP of the user. As described above, for sending the USSD request to the home SCP, the address of the home SCP are identified from home HLR of the user which in this situation would be the HLR of the primary service provider implemented in the home network. For the purpose, the address of the home HLR is determined by the MSC in a conventional manner based on the IMSI number and the MSISDN number of the UE generating the request. As described earlier, the user may request to switch from the secondary service provider to the former primary service provider as well, and in such a case, the request would be serviced by the secondary SCP. However, since the IMSI/MSISDN of the SIM relate to the primary service provider, the MSC would still query the home HLR associated with the user for current SCP address reference.

Upon receiving the switching request, referred to as a 'service provider switch request' or a 'SPS request' hereinafter, from the user, the home SCP may trigger an authorization of such a request. For this purpose, in one embodiment, the SCP may send an authorization request to a Service Provider Selector Node (SPSN).

According to an implementation of the present subject matter, the SPSN is an authenticating node between multiple service providers. The SPSN may provide connectivity between the SCPs of the multiple service providers based on service providers' agreements and user subscriptions/rights.

The operation of the SPSN may be elaborated using an example. For example, a USSD request may be sent by user A to switch from a primary service provider, say, service provider 'x' to a secondary service provider, say service provider 'y'. The SCP of the service provider 'x', may send an authorization request to the SPSN. The SPSN may verify the agreement between the service provider 'x' and the service provider 'y' for switching the user from the service provider 'x' to the service provider 'y'. Further, the SPSN may also check whether the user A has subscribed for a service to switch service providers. Once the checks are made and the existence of an agreement along with user subscription is verified, the SPSN may approve the authorization request.

In said implementation, along with the confirmation to the authorization request, the SPSN may provide the address and the location of a SCP of the secondary service provider to the HLR of the primary service provider. For example, in the above mentioned scenario, the SPSN may update the HLR of the service provider 'x' with the address and location of the SCP of the service provider 'y'.

In response to such information received from the SPSN, the home HLR of the primary service provider may update the address and location of the SCP of the secondary service provider, i.e., the secondary SCP. This enables the user to avail services of the secondary service provider, as explained previously. Further, in such an implementation, upon successful update, the HLR may send a 'successfully updated' message to the SPSN.

In yet another implementation, the home HLR may include multiple profiles, or subscription details associated with each user where each profile may include a different SCP address pertaining to a secondary service provider. In said implementation, the SPSN may activate the profile pertaining to a SCP of a secondary service provider in the home HLR based on the confirmation of the authorization request received from the home HLR. It would be appreciated that in case another profile is activated by the SPSN, the previous profile may be de-activated by the home HLR so that only one profile is in active state at any given point of time. It would also be appreciated that in situations a profile for the new SCP of the secondary service provider is not available with the home HLR; SPSN may create a profile and activate the same for further use. Upon successful update of the new SCP address or upon successful activation of a new profile, the SPSN may send a 'successful completion' request to the home SCP of the user. The home SCP of the user may in-turn send a 'successful completion' request to the user to intimate the successful switching of the service provider from the primary service provider to the secondary service provider.

Although it has been described that the SPSN provides the address and location of the secondary SCP to the home HLR, in another implementation of the present subject matter, along with the confirmation to the authorization request, the SPSN may provide the address of a SCP of the secondary service provider to be associated with the user, to the home SCP. In reference to the above mentioned example, according to the said implementation, the SPSN may provide the address of a SCP of the service provider 'y' to the SCP of the service provider 'x'. Based on the confirmation and the location of the new SCP, in said implementation, the home SCP may update the SCP address in the home HLR of the user. The update in the HLR may include change in the SCP address in accordance with the new received address of the secondary SCP. Although the description has been made with reference to the home SCP however, it would be understood that the same can be implemented through multiple SCPs.

In one implementation of the present subject matter, as described earlier, a user may have to subscribe beforehand for the service of dynamic service provider switching. The subscription may be done either with the primary service provider, or with the SPSN. It would be appreciated that the subscription for the dynamic service provider switching service is based on an agreement between the service providers, and its availability with the SPSN. In one example SPSN may be maintained by a statutory authority, such as a telecom authority of a jurisdiction that may provide terms of such agreements to which the various service providers in the jurisdiction comply.

Similarly, according to another implementation of the present subject matter, the user may also have an account with both, the primary and the secondary service provider to switch from the former to the latter. It would be understood that the account herein referred to, can either be a post-paid account or a pre-paid account where the user has registered with the service providers for the usage of communication services through a particular SIM. In a situation where a user has subscribed for dynamic service provider switching service and the SPSN receives a request from the user to switch from the primary service provider to the secondary service provider, the SCP of the secondary service provider may deny the association and may not provide the address of the SCP, if the user does not have an account with the secondary service provider.

In one embodiment, a user may have a universal account with the SPSN and the SCP of the primary service provider or the secondary service provider may utilize this account for the billing purpose. In this embodiment, the user would not require separate accounts with different service providers. The transactions between the service provider and the SPSN in such a case may be completed through encrypted data transfer in real time. The transactions may be similar to money transfer or any monetary transaction and may take place through known conventional methods. Since the techniques are well know, the description of the same has been omitted for the sake of brevity.

Although the description has been explained such that a SIM associated with a user is dynamically switched from the primary service provider to another secondary service provider, however, a user upon switching from the primary service provider to the secondary service provider, may also dynamically switch again to a former service provider. The SIM may either be a physical entity provided by the primary service provider, or may be a subscription associated with the user provided by the primary service provider. The former service provider may be any service provider other than the secondary service provider and may include the primary service provider as well. In such a scenario, according to an implementation of the present subject matter, the HLR associated with the user would be the home HLR of the primary service provider. In such a switching request, the SPS request would be serviced by the secondary SCP. However since the IMSI/MSISDN of the SIM relate to the primary service provider, the MSC to which the user is connected to while requesting the switch would query the home HLR for the SCP address reference. Further, the SCP details of the former service provider would be updated in the home HLR associated with the user and maintained by the primary service provider.

Accordingly, in GSM communication network, as explained before, the billing of a user is controlled by the home SCP associated with the user and defined in the home HLR of the service provider. In a situation where the address of the home SCP is changed in the home HLR of the primary service provider, the billing for the communication services availed by the user would be tracked by the new SCP catering to schemes, offers, subscriptions and rules of the secondary service provider. This change in the address of the home SCP would allow the user to switch between the service providers without changing the SIM, or the MSISDN or the IMSI number and pay according to the charges of the secondary service provider and avail different charges for communication services from different service providers without any hassle of changing the SIM or the MSISDN. The described method may also allow the users to utilize the services of different service providers without any requirement of a new modified communication device or a SIM.

Although the description herein is with reference to GSM communication network, the systems and methods may be implemented in other networks and devices, albeit with a few variations, as will be understood by a person skilled in the art. The other communication networks may include Global System for Mobile Communication (GSM) network, Universal Mobile Telecommunications System (UMTS) network, Long Term Evolution (LTE) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN).

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Figure 1:
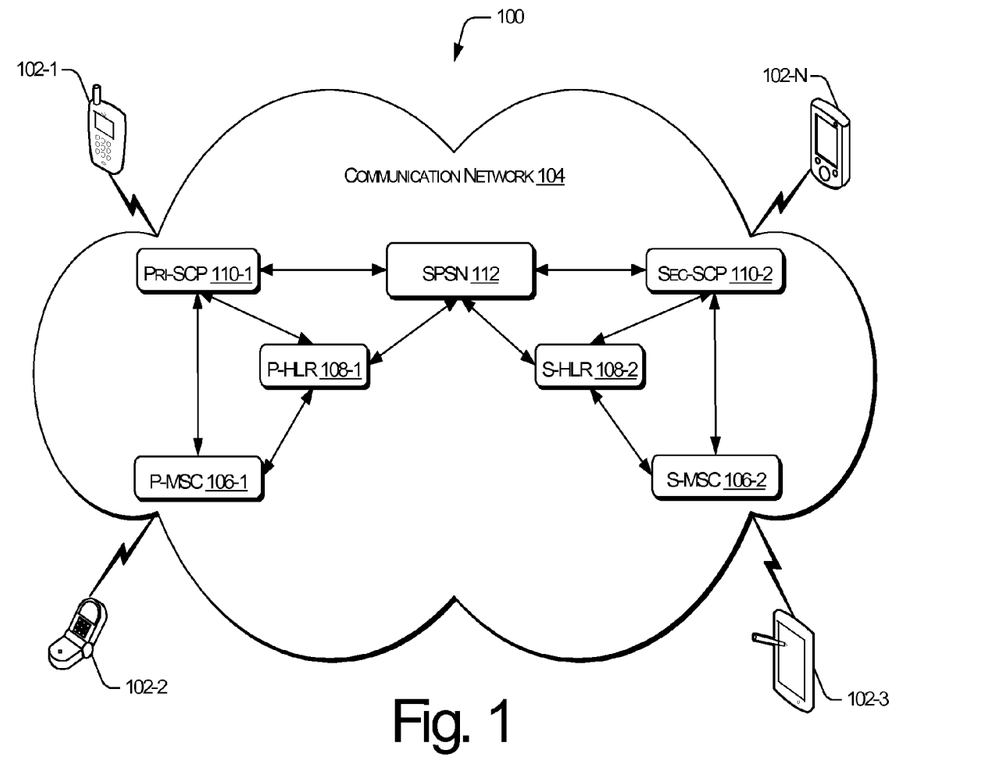
FIG. 1 illustrates an exemplary communication network environment, according to an embodiment of the present subject matter.
Figure 2A:
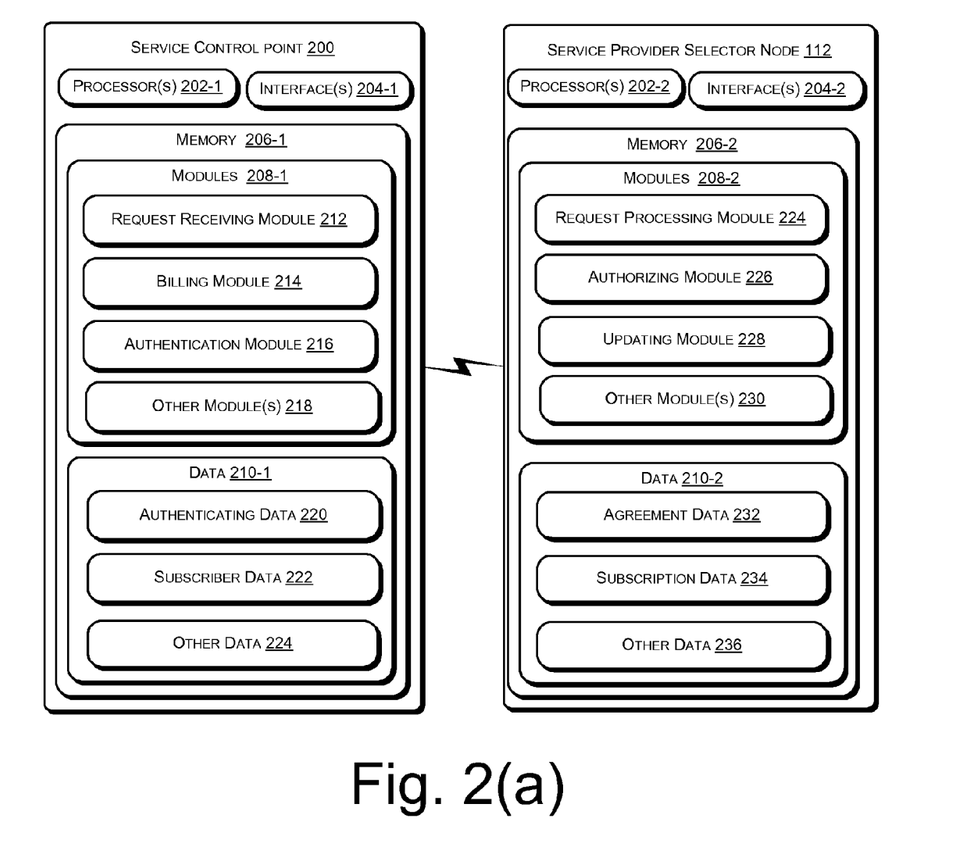
FIG. 2(a) schematically illustrates network entities for dynamically switching service provider, in accordance with an embodiment of the present subject matter.
Figure 2B:
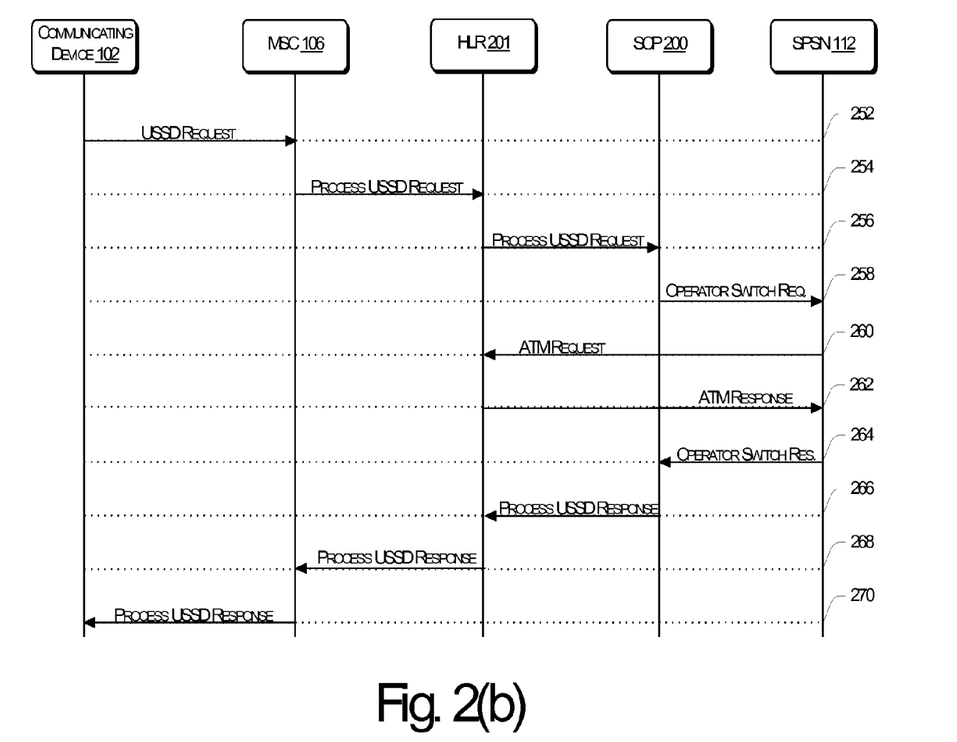
FIG. 2(b) is a call flow diagram indicating dynamically switching service providers, according to an embodiment of the present subject matter.
Figure 3:
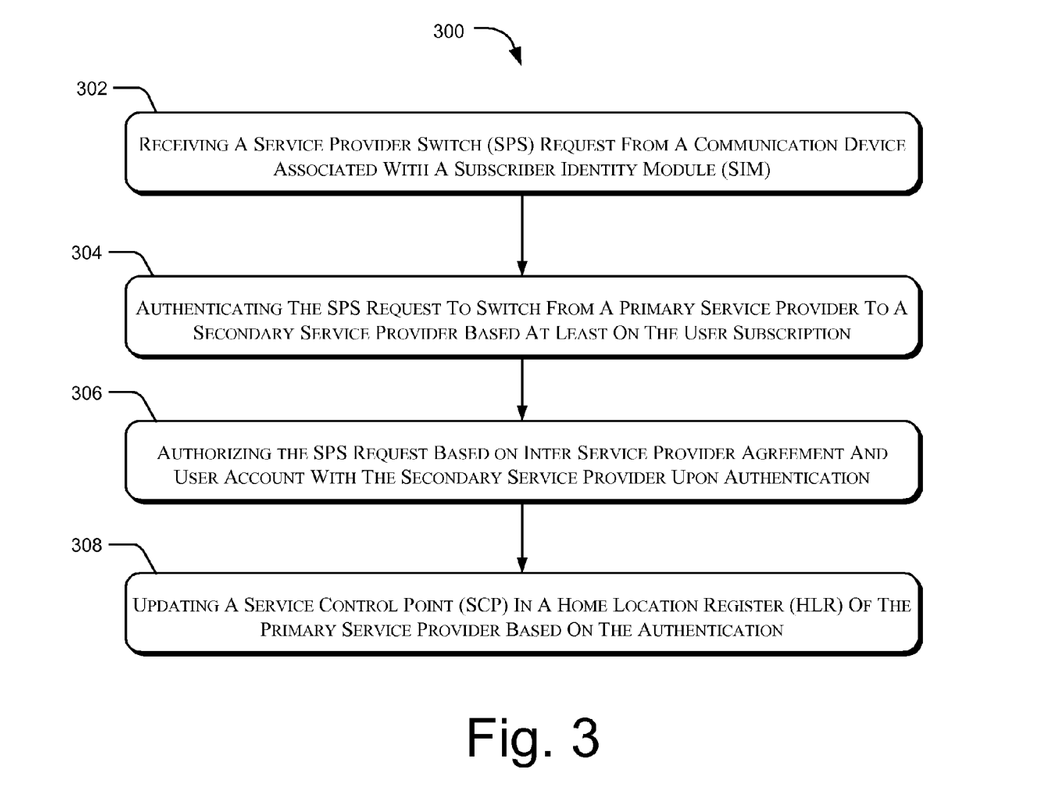
FIG. 3 illustrates a method to dynamically switch service providers, in accordance with an embodiment of the present subject matter.

The manner in which the systems and methods of dynamically switching service providers shall be explained in details with respect to the FIGS. 1-3. While aspects of described systems and methods for dynamically switching service providers can be implemented in any number of different computing systems, transmission environments, and/or configurations, the embodiments are described in the context of the following exemplary system(s).

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the word "connected" and "coupled" is used throughout for clarity of the description and can include either a direct connection or an indirect connection.

FIG. 1 illustrates a communication network environment 100 implementing dynamic switching of service providers, according to an embodiment of the present subject matter. The communication network environment 100 includes one or more communication devices 102-1, 102-2, 102-3, and 102-N (collectively referred to as communication devices 102) communicating with each other through a communication network 104. The communication devices 104 are User Equipments (UEs) used by user to communicate with each other. Further, the communication device 102 may include a SIM which may be associated with a MSISDN and an IMSI number. The communication devices 102 may include, without limitation, desktop computers, hand-held devices, laptops or other portable computers, network computers, mobile phones, landline phones, and the like. Each of the communication devices 102 works on a communication protocol as defined by the communication network 104 to which the communication device 102 is coupled.

The communication network 104 may be a wireless or a wired network, or a combination thereof. The communication network 104 can be a collection of individual networks, interconnected with each other and functioning as a single large network (e.g., the internet or an intranet). Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network 104 includes various network entities, such as gateways, routers; however, such details have been omitted for ease of understanding.

The description is explained with reference to the communication devices 102-1 and 102-3 however, the same can be extended to other communication devices as well. For the sake of explanation, the communication device 102-1 may be considered to be connected to a service provider which it may be registered with, i.e., the primary service provider of the communication device 102-1. Further, due to various reasons, such as being located in a non-home network, the communication device 102-3, may be connected to a service provider which may not be a primary service provider of the communication device 102-3. As apparent, the service provider with which the communication device 102-3 is connected is a secondary service provider for the communication device 102-3.

The communication network 104 may comprise more than one service providers. For the ease of explanation, considered herein are two service providers, namely, a primary service provider which in the above example, is the primary service provider of the communication device 102-1 and a secondary service provider which is a secondary service provider for the communication device 102-1.

In order to communicate with each other, each of the communication devices 102-1 and 102-3 connects to its respective base transceiver stations (not shown in the figure), which provide radio coverage within a cell. Multiple base transceiver stations connect to a base station controller (not shown in the figure), which provides local switching to effect handover between the base stations. The base station controller is further connected to a mobile switching center (MSC), which is responsible for providing communication services to subscribers, i.e., user of communication device 102-1, and user of communication device 102-3.

For example, the communication device 102-1, which may be in its home network and can be connected to the MSC 106-1, hereinafter interchangeably referred to as Primary-MSC (Pri-MSC) 106-1, through its own base station controller and other network entities (not shown) to transfer data and avail communication services, such as voice calls and messages. Similarly, there may exist another service provider, the secondary service provider, to which the communication device 102-1 may wish to switch to. The secondary service provider may implement an MSC 106-2, hereinafter interchangeably referred to as secondary-MSC (Sec-MSC) 106-2.

Further, the Pri-MSC 106-1 and the Sec-MSC 106-2 may be associated with a corresponding Home location register (HLR), such as a Primary HLR (P-HLR) 108-1 and a Secondary HLR (S-HLR) 108-2, hereinafter commonly referred to as HLR 108. It would be understood that typically, a HLR stores information associated with each service subscriber registered with the service provider. The information may include, but is not limited to, address of an MSC that covers the subscriber's CAMEL subscription information containing the home SCP address reference and service triggers, subscriber's home location, the address of an MSC where the subscriber is currently located or was last located etc. The HLR also stores information, such as the IMSI number associated with the SIM of each subscriber, and MSISDN number of the subscriber. It would be appreciated by a person skilled in the art that the Pri-MSC 106-1 and P-HLR 108-1 may be implemented as separate entities or can be implemented within a single unit. Similarly, the Sec-MSC 106-2 and the S-HLR 108-2 may be implemented as separate entities or can be implemented within a single unit.

The primary service provider and the secondary service provider may also implement Service Control Points (SCPs), such as a Primary SCP (P-SCP) 110-1, and a Secondary SCP (S-SCP) 110-2, commonly referred to as SCP 110. It would be understood that each service provider implements at least one SCP, which holds the account and service subscription information of the subscribers of the service provider. The account information may include the available balance of a subscriber, the block lists of the subscriber, the tariff plan selected by the subscriber, and the subscriptions adopted by the subscriber. During any usage of a communication service provided by the primary service provider, the P-SCP 110-1 may be contacted by the Pri-MSC 106-1 for authentication based on the account information, such as the available balance. Further, the P-SCP 110-1 may also charge the user, such as the primary user based on the stored tariff plan. It would be further understood that the details of the SCP associated with each subscriber is available with the HLR of the user. Therefore, the details of the P-SCP 110-1, associated with the communication device 102-1 may be stored in the P-HLR 108-1, maintained by the primary service provider.

Similarly, the secondary service provider may also implement and maintain at least one SCP, such as the S-SCP 110-2, to store user account information, and authenticate the communication services utilized by the users registered with the secondary service provider.

In one implementation, in order to connect the two MSCs 106-1 and 106-2, the communication network 104 may also include a gateway MSC (G-MSC) (not shown), which may act as a node to interconnect the two MSCs 106-1 and 106-2. It will be understood that G-MSC may be a separate entity or functionalities of the G-MSC may be integrated with the functionalities of the Pri-MSC 106-1 or the Sec-MSC 106-2. For the sake of explanation and simplicity, in said implementation, the G-MSC is integrated with the Pri-MSC 106-1.

The communication network 104 may further implement a Service Provider Selection Node (SPSN), such as a SPSN 112. The SPSN may be a network entity configured to communicate between the SCPs of different service providers, such as the primary service provider and the secondary service provider. The SPSN 112 may include the information about the inter service provider agreements and user subscriptions related to dynamic switching of service providers. In one implementation, the SPSN 112 may communicate between the P-SCP 110-1 and the S-SCP 110-2 of the primary service provider and the secondary service provider, respectively. The SPSN 112, based on the inter service provider agreements enable dynamic switching of the service provider for a user.

In one implementation, a user, utilizing the communication services within its home network, may request for change of its default service provider. In one example, the user may be a user of the communication device 102-1 also referred to as a primary user. In said scenario, the primary user may request the primary service provider for a change in service provider, such as to the secondary service provider. The primary user may be connected to the primary service provider through the Pri-MSC 106-1, and the data related to the user, such as the user's location, SIM, MSISDN, and the IMSI number may be stored in the P-HLR 108-1.

The primary user may send the SPS request to the primary service provider through the communication device 102-1 in the form of a USSD message. The USSD message may include the preference of the user about the service provider to which he wishes to switch. The SPS request may comprise a specific operator code Id indicative of the service provider to which he wishes to switch, and defined in the USSD message. In one implementation, the user may send the USSD message describing the service provider to be switched to as the secondary service provider. The USSD message sent to the primary service provider may be processed by the P-SCP 110-1. The P-SCP 110-2 may authenticate the USSD message based on the identity of the user. The authentication may be based on the MSISDN, the IMSI number, and the subscription of the primary user. For example, the primary user may have subscribed for the service of dynamic service provider switching with the primary service provider prior to sending the USSD message, and therefore, the P-SCP 110-1 would authenticate the USSD message based on a user subscription with the primary service provider. It would be further understood that USSD messages from users of the primary service provider who have not subscribed to the service of dynamic switching of the service provider, may be rejected by the P-SCP 110-1. The P-SCP 110-1 may authenticate the user to be a subscriber of the primary service provider, however due to non-subscription of the service, may reject the further processing of the SPS request.

Any user, such as the primary user, may subscribe to the service of the dynamic switching of the service provider based on the options made available by the default service provider of the user. In one implementation, the default service provider may allow subscription to the service of service provider switching through written requests. In another implementation, the default service provider may allow subscription to this service through USSD messages. It would be appreciated that the default service provider may also charge its subscribers in lieu of providing such services enabling switching from the primary service provider to the secondary service provider. Further, the charge may be billed or deducted from the user's account with the default service provider by the SCP associated with the user.

In yet another implementation of the present subject matter, the user may subscribe for this service of dynamic switching of the service provider with a central entity, such as the SPSN. For example, the primary user may subscribe for the service provider switch (SPS) service with the SPSN 112. The SPSN 112 may provide the subscription of the primary user based on the agreement between the primary service provider and the secondary service provider. A person skilled in the art would appreciate that the SPSN 112 may be controlled by a government authority of the jurisdiction, or by a collaborative body formed between one and more service providers.

As described before, the SPS request sent by the primary user in the USSD format may be processed by the P-SCP 110-1. In one implementation, upon authenticating the request sent by the primary user, the P-SCP 110-1 may send an authorizing request to the SPSN 112. In said implementation, the request may be sent through a XML or a diameter interface. In the request sent through the XML/Diameter interface, the P-SCP 110-1 may send the IMSI number of the primary user, and the standard pre-defined ID of the secondary service provider to which the primary service provider has requested to switch to, along with other details.

The SPSN 112 may enable the dynamic switching of the primary user, from the primary service provider to the secondary service provider upon receiving a SPS request from the P-SCP 110-1. For this purpose, the SPSN 112 may authorize the SPS request of the primary user based on the agreement between the primary service provider and the secondary service provider; and the subscription of the primary user with the primary service provider, as well as the secondary service provider. For example, the SPSN 112 may confirm the agreement between both the service providers and also query the S-SCP 110-2 of the secondary service provider for an existing account of the primary user. In other words, the primary user, apart from a subscription with the primary service provider, may also have an account with the secondary service provider. It would be understood that the details of the account of the primary user with the secondary service provider may be stored with the S-SCP 110-2 of the secondary service provider against the details of the primary user, such as the MSISDN, and the IMSI number.

In said implementation, upon verifying the agreement between service providers, and existence of an account of the primary user with the secondary service provider, the SPSN 112 may authorize the SPS request of the primary user. Further, the SPSN may update the details of the S-SCP 110-2 to the P-HLR 108-1 of the primary service provider. In one implementation, the SPSN 112 may send an Any Time Modification (ATM) request (on the MAP interface) to the P-HLR 108-1. The update of the SCP details associated with the primary user from P-SCP 110-1 to that of S-SCP 110-2 would enable the primary user to utilize the communication subscriptions/services at the charges, schemes, and offers provided by the secondary service provider. Also, since the P-SCP 110-1 of the primary service provider would not be triggered by the HLR 108-1 after the update in the SCP details with that of the S-SCP 110-2, the P-SCP 110-1 would not charge the primary user for the communication services utilized. In said implementation, the P-HLR 108-1 may send an ATM response to the SPSN 112 based on the successful update in the SCP details of the primary user.

Once the details of the S-SCP 110-2 are updated in the P-HLR 108-1 of the primary service provider associated with the primary user, any MSC to which the primary user gets connected to, would obtain the details of the S-SCP 110-2 during the information exchange of location update.

As explained previously, any MSC to which a user gets connected to, contacts the home HLR associated with the user based on its IMSI number, to request a location update. During the location update procedure, the MSC may provide the IMSI number of the user, the MSC Id, and the Id of the Visiting Location Register (VLR) associated with the home MSC, to the HLR of the user; along with other information. The home HLR may be updated with the location of the user based on the IMSI number, the MSC Id and the VLR Id. Further, the home HLR may provide the details of the user to the VLR of the MSC for temporary use, such as the MSISDN, CSI (CAMEL Subscription Information) and the SCP's Global Title Address details.

Therefore, when the primary user gets connected to a MSC, other than the Pri-MSC 106-1, the MSC may initiate a location update procedure for the primary user with the P-HLR 108-1 based on the IMSI number of the primary user. In one implementation, during the procedure of location update, the P-HLR 108-1 of the primary service provider may update the VLR of the MSC with the primary user's details including the details of the secondary service providers SCP, i.e., S-SCP 110-2. Therefore, the MSC would be updated with the primary user details along with the SCP details of the S-SCP 110-2. During any call initiated by the primary user after the completion of the SPS request, the MSC to which the primary user is connected to would trigger the S-SCP 110-2 managed by the secondary service provider, for the purpose of authentication of calls, call control, management of subscriptions/offers, and deduction of accounts balance.

Similarly, if a user utilizing the secondary communication device 102-3 and connected to the secondary service provider initiates a call for the primary user who has dynamically switched his service provider, the Sec-MSC 110-2 to which the secondary user is connected to, would communicate with the G-MSC (not shown) of the primary service provider of the switched user. The G-MSC of the primary service provider may query the P-HLR 108-1 to receive the details regarding the location of the SCP of primary service provider. The P-HLR 108-1 may initiate a PRN procedure and communicate with the MSC to which the primary user is presently connected to. During the PRN procedure, the P-HLR 108-1 may receive the Mobile Station Roaming Number (MSRN) associated with the primary user. The P-HLR 108-1 may provide a (T-CSI) associated with the primary user to the G-MSC along with the details of the S-SCP 110-2.

Further, the S-SCP 110-2 may charge the primary user based on the tariff provided by the secondary service provider. It would be understood that while receiving a terminating call, the primary user may either be in home location or in a non-home location and, based on the location of the primary user, the P-HLR 108-1 may contact the MSC connected to the primary user.

It would be appreciated that upon successful service provider switch for the primary user, the authorization, and the charges for the communication services utilized by the primary user, would be performed by the S-SCP 110-2 and the primary user would be charged based on the tariff of the second service provider. For the sake of better understanding, the details of the SPSN 112 and the SCP 110-1 are further explained in greater detail with reference of FIGS. 2(a) and 2(b).

FIG. 2(a) illustrates the components of the SCP 110, and the components of the SPSN 112, according to an embodiment of the present subject matter. In accordance with the present subject matter, the SCP 110 and the SPSN 112 are communicatively coupled to each other through the various components of the communication network 104 (as shown in FIG. 1).

FIG. 2(b) illustrates a call-flow diagram indicating dynamic switching between service providers, in accordance with an embodiment of the present subject matter. The various arrow indicators used in the call-flow diagram depict the transfer of information between the communication device 102, the MSC 106, the home HLR of a user utilizing the communication device HLR 201, the home SCP of the user SCP 200, and the SPSN 112. In many cases, multiple network entities besides those shown may lie between the entities, including transmitting stations, and switching stations, although those have been omitted for clarity. Similarly, various acknowledgement and confirmation network responses may also be omitted for clarity.

The different components of the SCP 200 and the SPSN 112 shown in FIG. 2(*a*) have been described with reference to the call flow represented in FIG. 2(*b*), however it would be understood that the SCP 200 and the SPSN 112 may be implemented in a different manner, without digressing from the scope and spirit of the present subject matter. Further, although the description of FIG. 2(*a*) and FIG. 2(*b*) has been provided with respect to a GSM network, it will be understood the dynamic switching of service providers may be implemented for other networks as well, for example, CDMA network.

The SCP 200 and the SPSN 112 include processors 202-1, 202-2, collectively referred to as processor 202 hereinafter. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

Also, the SCP 200 and the SPSN 112 include interface(s) 204-1, 204-2, collectively referred to as interfaces 204. The interfaces 204 may include a variety of software and hardware interfaces that allow the SCP 200 and the SPSN 112 to interact with the communication network 104, or with each other. Further, the interfaces 204 may enable the SCP 200 and the SPSN 112 to communicate with other communication and computing devices, such as web servers and external repositories. The interfaces 204 may facilitate multiple communications within a wide variety of networks and protocol types, including wire networks, for example, LAN, cable, etc., and wireless networks, for example, WLAN, cellular, satellite-based network, etc.

The SCP 200 and the SPSN 112 may include memory 206-1, and 206-2, respectively, collectively referred to as memory 206. The memory 206-1 and 206-2 may be coupled to the processor 202-1, and the processor 202-2, respectively. The memory 206 may include any computer-readable medium known in the art including, for example, volatile memory (e.g., RAM), and/or non-volatile memory (e.g., EPROM, flash memory, etc.).

The memory 206-1, 206-2 of the SCP 200 and the SPSN 112 includes modules 208-1, 208-2 and data 210-1, 210-2, respectively, collectively referred to as modules 208 and data 210, respectively. The modules 208 include routines, programs, objects, components, data structures, and the like, which perform particular tasks or implement particular abstract data types. The modules 208 further include modules that supplement applications on the SCP 200 and the SPSN 112, for example, modules of an operating system. The data 210 serves, amongst other things, as a repository for storing data that may be fetched, processed, received, or generated by one or more of the modules 208.

In an implementation, the modules 208-1 of the SCP 200 includes a request receiving module 212, a billing module 214, an authentication module 216 and other module(s) 218. In said implementation, the data 210-1 of the SCP 200 includes authentication data 220, subscriber data 222, and other data 224. The other module(s) 218 may include programs or coded instructions that supplement applications and functions, for example, programs in the operating system of the SCP 200, and the other data 224 comprise data corresponding to one or more other module(s) 218.

Similarly, in an implementation, the modules 208-2 of the SPSN 112 include a request processing module 224, an authorizing module 226, an updating module 228, and other module(s) 230. In said implementation, the data 210-2 of the SPSN includes agreement data 232, subscription data 234, and other data 236. The other module(s) 230 may include programs or coded instructions that supplement applications and functions, for example, programs in the operating system of the SPSN 112, and the other data 236 comprise data corresponding to one or more other module(s) 230. The other data may include data related to operators, such as operator Id. SCP addresses, and the like.

Referring to FIG. 2(*b*), the communication device 102 may be connected to a MSC 106 which may either be the MSC of its default service provider, or any other service provider. The MSC 106 may query the details associated with the SIM of the communication device 102 from the home HLR of the user utilizing the communication device 102, such as HLR 201. Further, the HLR 201 may include the details of the home SCP associated with the user, shown as SCP 200.

According to an implementation of the present subject matter, the SCP 200 and the SPSN 112 are configured to provide dynamic service provider switching capability to a user. A user may send a send a service provider switch request to switch its default service provider from the primary communication device 102-1 in the form of a SPS request. In one implementation, the SPS request may be in the USSD format, as indicated by the step 252. The USSD request may be sent to the MSC to which the user is connected to, i.e., the MSC 106. It would be understood that the USSD request sent by the user would be processed by the home SCP of the user, such as the SCP 200. Since the details of the SCP associated with any user are available with the home HLR, the USSD request initiated by the user is forwarded to primary HLR 201, according to step 254. Based on the details stored with the HLR 201 about the user, the HLR 201 may identify the SCP 200 to be associated with the user. At step 256, the HLR 201 may then send the USSD 'SPS' request to the SCP 200. It would be understood that the SPS request to switch from the primary service provider to the secondary service provider, the request may be sent to the home SCP associated with the user. Therefore, for any other user sending a USSD 'SPS' request, the associated SCP may be different from the SCP 200 and, the HLR 201 may sent the request to that SCP for processing, i.e., in situations when the switch request is made to switch the service provider from secondary to primary, the SPS request may be sent to the SCP of the service provider currently associated with the user.

In one implementation, a SCP 200, implemented by a service provider includes a request receiving module 212. The request receiving module is configured to receive USSD 'SPS' requests sent by the users associated with the SCP 200. In said implementation, the request receiving module 212 may identify the user for which the request was initiated based on the details present in the request, such as the IMSI number, and the MSISDN. Further, the request receiving module 112 may also identify the service provider to which the user has requested to switch to. Further, in said situation, upon identification of the 'SPS' request, the authentication module 216 may authenticate the SPS request based on the user subscription of such service. In one implementation, the authentication module 216 may be configured to authenticate the 'SPS' request based on the subscription of the user for this service. If the user has subscribed to the 'SPS' service, the authentication module 216 may authenticate the request to be 'Valid' and request for an authorization and switch operation from the SPSN 112.

In said implementation, the authentication module 216 may send the authorization request to the SPSN 112 through a XML/Diameter interface. The request may be sent as an operator switch request, as indicated in step 258. The SPSN 112 may include a request processing module 224. The request processing module 224 may be configured to identify 'SPS' requests received through the XML/Diameter interface. The request processing module 224 may determine the 'SPS' request and determine the details associated with the user based on the IMSI/MSISDN number. The request processing module 224 may also identify the Id of the service providers received in the request to which the user wishes to switch to, such as the secondary service provider.

For the secondary service provider, received in the 'SPS' request at the step 258, the authorizing module 226 of the SPSN 112 is configured to check the inter service provider agreements. The inter service provider agreements may define the contract or an undertaking between the service providers to provide the service of service provider switching to their subscribers. The authorization module 226 may also confirm an account of the user with the service provider to which he has requested to switch to. For example, a user A may send a request to switch his service provider from service provider 'x' to service provider 'y'. In such a scenario, the authorization module 226 may check for an agreement between the service provider 'x' and the service provider 'y'. The authorization module 226 may also check for an account of the user A with the service provider 'y' before confirming the authorization request. Once the authorization module 226 checks the existence of an agreement along with user account, the authorization module 226 may approve the authorization request.

In one implementation, the SPSN 112 may also include the updating module 228 configured to update the HLR of the user requesting for service provider switch with the SCP details of the requested service provider. In said implementation, the updating module 228 may update the home HLR of the user, such as the HLR 201 with the details of the SCP Address of the secondary service provider through an ATM request, as shown at step 260.

Further, according to an implementation of the present subject matter, the HLR associated with the user, such as the HLR 201 may also include a profile module (not shown) to store different profiles associated with its subscribers. The HLR 201 may include multiple profiles associated with a user where each profile may include the details of one SCP associated with one service provider. In other words, for different service providers, the home HLR of the user would include different profiles. In such an implementation, the updating module 228, instead of sending the address details of the SCP of the secondary service provider, may send a request to activate a profile in the HLR 201, where the profile includes the details of the SCP of the secondary service provider. In such a scenario, referring to the above described example, the updating module 228 may request to activate a profile in the HLR 201 which includes the details of the SCP of the service provider 'y'. Also, in a situation where the profile including the details of any SCP of a service provider does not exist with the HLR 201, the updating module 228 of the SPSN 112 may request for creation of a new profile in the HLR 201 associated with the SCP details of the secondary service provider.

In said implementation where the SPSN 112 sends an ATM request to the HLR 201 with the details of the SCP of the secondary service provider, the profile module of the HLR 201, may update the SCP Address details in the data of the user in the HLR 201. Similarly, the profile module of the HLR 201 may instead activate a profile requested by the SPSN 112. It would be understood that upon activation of one profile, the profile module of the HLR 201 may deactivate the previously activated profile for the user such that at any given time instance, only one profile for a user is in active state.

In yet one another implementation of the present subject matter, the profile module of the HLR 201, upon successful update of the SCP details of the secondary service provider, such as the location and the address, may send an ATM response to the SPSN 112. The ATM response may indicate a 'successful completion' of the update of the SCP details/ subscriber profile of the secondary service provider in the data of the HLR, also shown in step 262.

The request processing module 224 of the SPSN 112, upon receiving the 'successful completion' response from the P-HLR 108-1, may send a 'successful completion' response in the USSD Response to the user. During this process, the request processing module 224 may intimate the SCP 200 about the completion of the operator switch request. Step 264 indicates such a response from the SPSN 112 to the SCP 200. At step 266, 268, and 270, the SCP 200; to intimate the successful completion of the service provider switching to the user in the form of an USSD response. Once the service provider switching is complete for the user, any communication service utilized by the user may be charged by the SCP of the secondary service provider through the billing module 214. It would be further appreciated that the billing is done based on the user subscription and the tariff chosen by the user. The details related to communication service charges are available with a SCP associated with a user, as would be understood by those skilled in the art.

FIG. 3 illustrates an exemplary method 300 for dynamic switching between service providers in a communication network, according to an embodiment of the present subject matter. The order in which the method 300 is described is not intended to be construed as a limitation, and any number of the described method blocks can be combined in any order to implement the method 300, or an alternative method. Additionally, individual blocks may be deleted from the method without departing from the spirit and scope of the subject matter described herein. Furthermore, the method can be implemented in any suitable hardware, software, firmware, or combination thereof.

The method(s) may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

A person skilled in the art will readily recognize that steps of the method can be performed by programmed computers. Herein, some embodiments are also intended to cover program storage devices, for example, digital data storage media, which are machine or computer readable and encode machine-executable or computer-executable programs of instructions, wherein said instructions perform some or all of the steps of the described method. The program storage devices may be, for example, digital memories, magnetic storage media such as a magnetic disks and magnetic tapes, hard drives, or optically readable digital data storage media. The embodiments are also intended to cover both communication network and communication devices configured to perform said steps of the exemplary method.

At block 302, a Service Provider Switch (SPS) request from a communication device associated with a Subscriber Identity Module (SIM) is received. In one implementation, the user sends the SPS request in the form of a USSD message. The USSD message may include the details of the user along with the details of a primary service provider, presently subscribed by the user and a secondary service provider to which the user wishes to switch to. In one implementation, the USSD request is processed by a Service Control Point (SCP) associated with the user.

At block 304, the SPS request to switch from a primary service provider to a secondary service provider is authenticated based at least on the user subscription. In one implementation, the SPS request sent as the USSD message is validated based on the user subscription to the SPS service provided by the primary service provider. In said implementation, the SCP associated with the user may authenticate the SPS request. Further, it would be understood that the details of the user are available with the SCP associated with it along with the subscription and account details.

At block 306, the SPS request based on inter service provider agreement and user account with the secondary service provider is authorized. The inter service provider agreement may define the agreement between the primary service provider and the secondary service provider to provide service provider switching service to the subscribers. Such agreements may be available with a Service Provider Selection Node (SPSN). The SPSN may communicate between the SCPs of different service providers and verify the agreement between such service providers. The SPSN may further verify that the user requesting for service provider switch, has an account with the secondary service provider. The account information may be available with the SCP of the secondary service provider along with other user information.

At block 308, upon authorization of the SPS request, the Home Location Register of the user is updated with the SCP details of the secondary service provider. In one implementation, the SCP details of the secondary service provider are updated in the HLR of the primary service provider.

Although embodiments for methods and systems for dynamic switching of a SIM associated with a user between service providers have been described in a language specific to structural features and/or methods, it is to be understood that the invention is not necessarily limited to the specific features or methods described. Rather, the specific features and methods are disclosed as exemplary embodiments for dynamic switching.

The invention claimed is:

1. A method for dynamically switching between different network service providers, the method comprising:
receiving, from a user equipment (UE) having a subscriber identity module (SIM) associated with a primary service provider, a service provider switch (SPS) request, wherein the request is indicative of switching the SIM from the primary service provider to a secondary service provider;
authenticating the SPS request based at least on a user subscription by requesting authorization of the SPS request from a service provider selector node (SPSN) and receiving a confirmation from the SPSN, in response to the requested authorization, wherein the confirmation is indicative of a successful authorization, and wherein the confirmation is based at least on the user subscription, wherein the SPSN comprises an authenticating node between multiple service providers that provides connectivity between service control points (SCPs) of the service providers based on service providers' agreements and user subscriptions; and
triggering an update of service control point (SCP) details in a home location register (HLR) of the primary service provider based on receipt of a response to the authentication, wherein the update switches the SIM from the primary service provider to the secondary service provider.

2. The method as claimed in claim 1, wherein the authorization is requested over one of a XML interface and a diameter interface.

3. The method as claimed in claim 1, wherein the authenticating is based on one or more of agreement rules between the primary service provider and the secondary service provider, and the user subscription.

4. The method as claimed in claim 1, wherein the update of the SCP details comprises modifying the SCP address of the primary service provider in the HLR to the SCP address of the secondary service provider.

5. The method as claimed in claim 1, wherein the update of the SCP comprises activating a profile with the SCP details of the secondary service provider in the HLR.

6. The method as claimed in claim 1, wherein the SPS request is in an Unstructured Supplementary Service Data (USSD) format.

7. The method as claimed in claim 1, wherein the method further comprises sending a switching confirmation request to the UE, wherein the switching confirmation request is indicative of a successful switch from the primary service provider to the secondary service provider.

8. The method as claimed in claim 1, wherein the triggering is in an Any Time Modification (ATM) request format.

9. The method as claimed in claim 1, the method further comprising:

receiving, from the UE, another SPS request, wherein the another SPS request is indicative of switching the SIM from the secondary service provider to a former service provider; and triggering an update of SCP details in the HLR of the primary service provider.

10. The method as claimed in claim 9, wherein the update of the SCP details comprises modifying the SCP details of the secondary service provider in the HLR to the SCP details of the former service provider.

11. A Service Control Point (SCP) for dynamically switching between different network service providers, the SCP comprising:
  a processor; and
  a memory coupled to the processor, the memory comprising:
    a request receiving module configured to receive a service provider switch (SPS) request from a User Equipment (UE) having a subscriber identity module (SIM) associated with a primary service provider, wherein the SPS request is indicative of switching the SIM from the primary service provider to a secondary service provider; and
    an authentication module configured to:
      authenticate the SPS request based at least on a user subscription and send the SPS request to a Service Provider Selection Node (SPSN) for authorization, and wherein the authorization is based at least on an agreement between the primary service provider and the secondary service provider to trigger the update of SCP in the HLR; and
      trigger an update of a service control point (SCP) details in a home location register (HLR) of the primary service provider based on response to the authentication.

12. The SCP as claimed in claim 11, wherein the request receiving module is further configured to receive a successful completion response from the SPSN.

13. A Service Provider Selector Node (SPSN) comprising:
  a processor; and
  a memory coupled to the processor, the memory comprising:
    a request processing module configured to receive a service provider switch (SPS) request, wherein the SPS request is indicative of a request to switch a subscriber identity module (SIM) associated with a primary service provider, from the primary service provider to a secondary service provider;
    an authorizing module configured to authorize the SPS request based at least on an agreement between the primary service provider and a secondary service provider;
    an updating module configured to update address of the secondary service provider's SCP in a home location register (HLR) of the primary service provider, wherein the SPSN comprises an authenticating node between multiple service providers that provides connectivity between service control points (SCPs) of the service providers based on service providers' agreements and user subscriptions.

14. The SPSN as claimed in claim 13, wherein the updating module is configured to activate a profile associated with the SCP of the secondary service provider in the HLR of the primary service provider.

15. A Home Location Register (HLR) comprising:
  a processor; and
  a memory coupled to the processor, the memory comprising:
    a profile module configured to:
      obtain a service control point (SCP) update request, for a subscriber identity module (SIM), wherein the request is indicative of details associated with a SCP of a secondary service provider for updation with the SIM; and
      communicate the details associated with the SCP of the secondary service provider to a mobile service switching center (MSC), wherein the SCP update request is obtained from one of a SCP of a primary service provider, and a service provider selector node (SPSN).

16. A non-transitory computer-usable data carrier storing instructions that, when executed by a computer, cause the computer to execute a method comprising:
  receiving, from a user equipment (UE) having a subscriber identity module (SIM) associated with a primary service provider, a service provider switch (SPS) request, wherein the request is indicative of switching the SIM from a primary service provider to a secondary service provider;
  authenticating the SPS request based at least on a user subscription by requesting authorization of the SPS request from a service provider selector node (SPSN) and receiving a confirmation from the SPSN, in response to the requested authorization, wherein the confirmation is indicative of a successful authorization, and wherein the confirmation is based at least on the user subscription, wherein the SPSN comprises an authenticating node between multiple service providers that provides connectivity between service control points (SCPs) of the service providers based on service providers' agreements and user subscriptions; and
  triggering an update of a service control point (SCP) in a home location register (HLR) of the primary service provider based on response to the authentication.

\* \* \* \* \*